US012012803B2

(12) United States Patent
Patock et al.

(10) Patent No.: US 12,012,803 B2
(45) Date of Patent: Jun. 18, 2024

(54) SEAL FOR AN OVERHEAD DOOR

(71) Applicant: Thermo Traks Inc, Spicer, MN (US)

(72) Inventors: John D. Patock, Spicer, MN (US); Carl J. Peterson, Hawick, MN (US)

(73) Assignee: THERMO TRAKS INC., Spicer, MN (US)

(*) Notice: Subject to any disclaimer, the term of this patent is extended or adjusted under 35 U.S.C. 154(b) by 0 days.

(21) Appl. No.: 17/540,821

(22) Filed: Dec. 2, 2021

(65) Prior Publication Data

US 2023/0175315 A1 Jun. 8, 2023

(51) Int. Cl.
*E06B 7/22* (2006.01)
*E06B 3/88* (2006.01)

(52) U.S. Cl.
CPC . *E06B 7/22* (2013.01); *E06B 3/88* (2013.01)

(58) Field of Classification Search
CPC ..... E06B 7/22; E06B 3/88; E06B 7/18; E06B 7/20; E06B 7/21; E06B 7/2316
USPC .............................. 49/197–200, 475.1–500.1
See application file for complete search history.

(56) References Cited

U.S. PATENT DOCUMENTS

| | | | | |
|---|---|---|---|---|
| 891,652 | A * | 6/1908 | Akre | E06B 7/22 16/86 A |
| 1,763,603 | A | 6/1930 | Donahue | |
| 1,921,193 | A | 8/1933 | Kelly | |
| 1,948,065 | A | 2/1934 | Clark | |
| 1,983,856 | A | 12/1934 | Johnson | |
| 1,990,470 | A | 2/1935 | Clark | |
| 1,990,870 | A | 2/1935 | Kelly | |
| 2,066,558 | A | 1/1937 | Dautrick | |
| 2,090,146 | A | 8/1937 | Pixley | |
| 2,093,020 | A * | 9/1937 | Norberg | E05D 15/24 160/40 |
| 2,106,322 | A | 1/1938 | Harnly | |
| 2,591,833 | A | 4/1952 | Krelmendahl | |
| 2,612,664 | A | 10/1952 | Sidden | |
| 2,757,422 | A | 8/1956 | Flicker | |
| 2,827,114 | A | 3/1958 | Stroup | |
| 3,090,427 | A | 5/1963 | Stroup | |
| 3,184,808 | A | 5/1965 | Lyon | |
| 3,456,390 | A | 7/1969 | Harper | |
| 3,788,008 | A | 1/1974 | Yackiw | |
| 4,115,973 | A | 9/1978 | Anderson | |

(Continued)

FOREIGN PATENT DOCUMENTS

| | | | |
|---|---|---|---|
| BR | 112013022113-5 | * | 10/2020 |
| GB | 1 573 837 | * | 8/1980 |

(Continued)

OTHER PUBLICATIONS

"Q-Lon foam weatherseal: for PVC, timber and aluminum applications," Schlegel Q-Lon Brochure, www.schlegel.com, Sep. 2013, 36 pages.

(Continued)

*Primary Examiner* — Gregory J Strimbu
(74) *Attorney, Agent, or Firm* — Merchant & Gould P.C.

(57) ABSTRACT

A seal for an overhead door includes a first sidewall, and a second sidewall that extends from the first sidewall. The first and second sidewalls extend beyond a bottom corner of the overhead door to cover an opening formed by compression of an astragal attached to a bottom surface of the overhead door.

16 Claims, 20 Drawing Sheets

(56) References Cited

U.S. PATENT DOCUMENTS

| | | | | |
|---|---|---|---|---|
| 4,119,133 | A | 10/1978 | Wolf | |
| 4,185,417 | A * | 1/1980 | McKann | E06B 7/2316 49/470 |
| 4,250,941 | A | 2/1981 | McNally | |
| 4,320,793 | A | 3/1982 | Lindbergh | |
| 4,447,988 | A | 5/1984 | Cole | |
| 4,800,618 | A | 1/1989 | Putz | |
| 4,898,760 | A | 2/1990 | Halberstadt | |
| 4,930,257 | A | 6/1990 | Windgassen | |
| 5,347,759 | A | 9/1994 | Kobayashi | |
| 5,404,927 | A * | 4/1995 | Bailey | E05D 13/1215 16/97 |
| 5,408,784 | A | 4/1995 | Wruck | |
| 5,435,104 | A | 7/1995 | Dietrich | |
| 5,454,192 | A * | 10/1995 | Adler | E06B 7/20 49/307 |
| 5,954,111 | A | 9/1999 | Ochoa | |
| 6,314,683 | B1 | 11/2001 | Vesa | |
| 6,374,567 | B1 | 4/2002 | Mullet | |
| 6,588,482 | B2 * | 7/2003 | Wright | E05D 13/10 160/193 |
| 6,772,560 | B2 | 8/2004 | Dischiant | |
| 6,928,696 | B2 | 8/2005 | Wartman | |
| 7,887,126 | B2 | 2/2011 | Grummett | |
| 8,091,607 | B2 * | 1/2012 | Aquilina | E05D 15/24 160/201 |
| 8,146,985 | B2 | 4/2012 | Nelson | |
| 8,684,065 | B2 | 4/2014 | Peterson | |
| 8,881,464 | B1 | 11/2014 | Huckeba | |
| 8,910,421 | B2 | 12/2014 | Potter | |
| 9,032,668 | B2 | 5/2015 | Blackwood | |
| 9,045,937 | B2 | 6/2015 | Peck | |
| 9,845,638 | B1 | 12/2017 | Cunningham | |
| 9,982,478 | B2 | 5/2018 | Boer | |
| 10,563,453 | B2 | 2/2020 | Steinke | |
| 11,180,949 | B2 | 11/2021 | Patock | |
| 2006/0023068 | A1 | 2/2006 | Bellemare | |
| 2009/0008404 | A1 | 1/2009 | Foster | |
| 2011/0021435 | A1 | 1/2011 | Bellota | |
| 2012/0030454 | A1 | 2/2012 | Preising, Jr. | |

FOREIGN PATENT DOCUMENTS

| | | |
|---|---|---|
| GB | 2142073 A | 1/1985 |
| GB | 2211235 A | 6/1989 |

OTHER PUBLICATIONS

Garage Door Seals: Top and Side Seals, DDM Garage Doors, accessed Nov. 27, 2017, 6 pages.

EverMark 4-9/16 in.x3.43 in.x83 in. Primed Frame Set, The Home Depot Inc., accessed Nov. 27, 2017, 4 pages.

M-D Building Products 36 in.x84 in. White Compression Door Jamb Weatherstrip Set with Wood Step, The Home Depot Inc., accessed Nov. 27, 2017, 4 pages.

Frost King E/O 3 in.x108 in. Top and Sides Vinyl Garage-Door Weather-Strip, The Home Depot Inc., accessed Nov. 27, 2017, 4 pages.

Frost King E/O 1 in.x8 ft. White Vinyl-Covered Foam Weatherstrip Kerf Door Seal, The Home Depot Inc., accessed Nov. 27, 2017, 4 pages.

Frost King E/O 2 in.x17 ft. Wood Thermo Plastic Door Set, The Home Depot Inc., accessed Nov. 27, 2017, 4 pages.

* cited by examiner

SEAL FOR AN OVERHEAD DOOR

BACKGROUND

Overhead doors are frequently used in commercial and residential buildings. Unlike conventional swing style doors, overhead doors are not directly connected to the opening. Instead, overhead doors typically slide up and down along tracks positioned on opposite sides of the opening. Overhead doors typically have a gap around their perimeter and the opening to allow the overhead doors to slide on the tracks without binding. As a result, it can be difficult to properly seal the area around an overhead door.

SUMMARY

In general terms, the present disclosure relates to a seal for an overhead door. In one possible configuration, the seal covers an opening formed by compression of an astragal attached to a bottom surface of the overhead door. Various aspects are described in this disclosure, which include, but are not limited to, the following aspects.

In one aspect, a seal for an overhead door comprises: mutually perpendicular height, width, and depth; a first sidewall delimited by the height and width; a second sidewall extending from the first sidewall, and delimited by the height and depth, the second sidewall including: a longitudinal portion; a lateral portion extending from the longitudinal portion; and at least one aperture configured to receive a fastener for attaching the seal to a bottom corner of the overhead door, the at least one aperture having a length providing a tolerance for the seal to move relative to the overhead door and the fastener.

In another aspect, a kit for an overhead door comprises: the overhead door having: an exterior surface; an interior surface separated from the exterior surface by a side surface; and an astragal attached to a bottom surface of the overhead door; and a seal for covering a space formed by compression of the astragal, the seal including: a first sidewall configured to abut the exterior surface of the overhead door; a second sidewall extending from the first sidewall, and configured to abut the side surface of the overhead door, the first and second sidewalls configured to extend beyond the bottom surface of the overhead door; and at least one aperture configured to receive a fastener for attaching the seal to a bottom corner of the overhead door, the at least one aperture having an extended length providing a tolerance for the seal to move relative to the overhead door and the fastener when the seal hits the ground.

In another aspect, a seal for an overhead door comprises: a first sidewall; a second sidewall extending from the first sidewall, the first and second sidewalls defining an interior corner for covering an exterior surface and a side surface at a bottom corner of the overhead door, the second sidewall including: a longitudinal portion; a lateral portion extending from the longitudinal portion; and at least one aperture that is configured to receive a fastener for attaching the seal to the bottom corner of the overhead door.

DESCRIPTION OF THE FIGURES

The following drawing figures, which form a part of this application, are illustrative of the described technology and are not meant to limit the scope of the disclosure in any manner.

DETAILED DESCRIPTION

Figure 1:
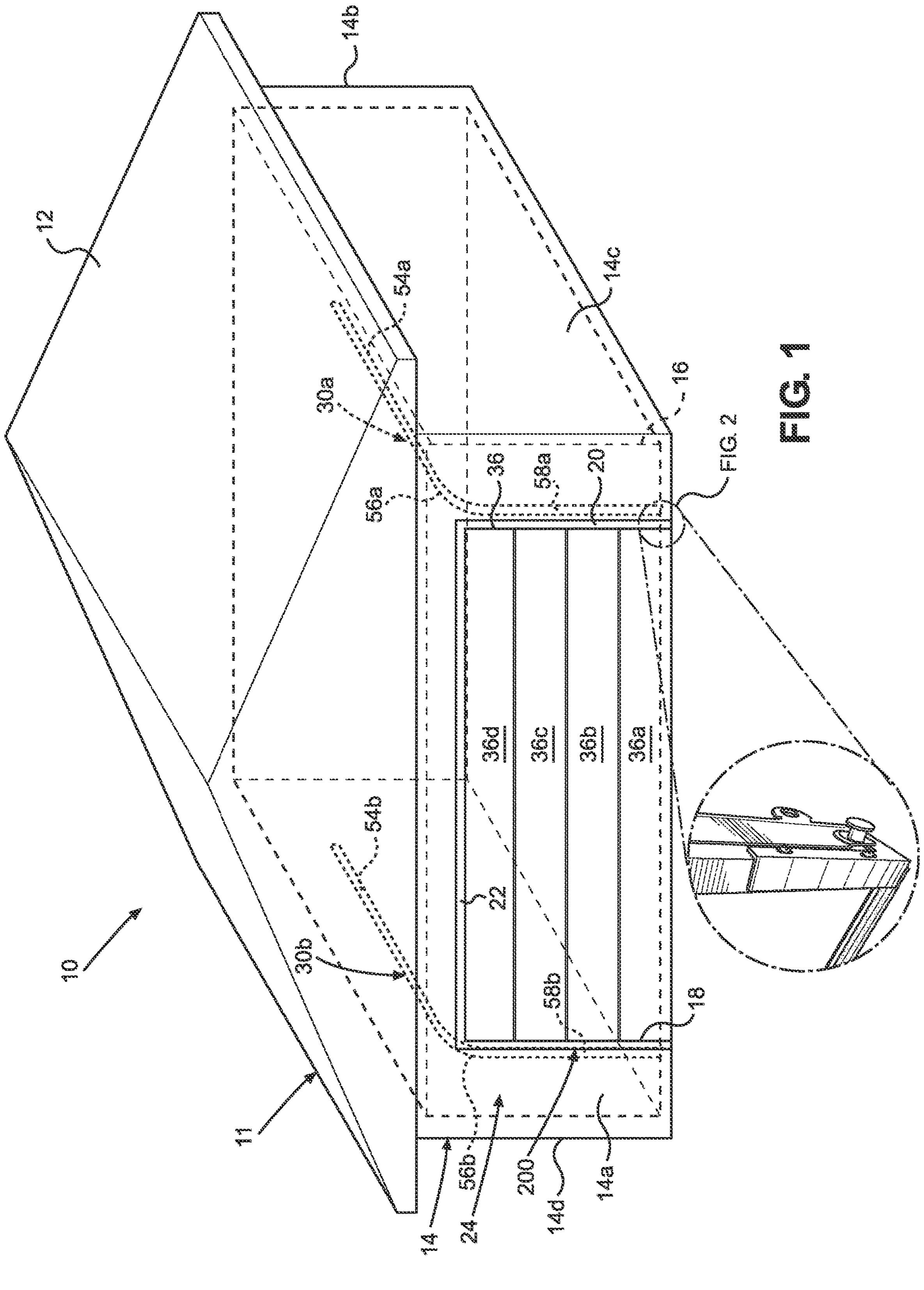
FIG. 1 is an isometric view of a storage enclosure having an overhead door.

Referring now to FIG. 1, a storage enclosure 10 is shown. The storage enclosure 10 includes an enclosure 11 including a top 12 and a plurality of sidewalls 14. In the depicted embodiment of FIG. 1, the enclosure 11 is shown as a garage.

The plurality of sidewalls 14 includes a first sidewall 14*a*, an oppositely disposed second sidewall 14*b*, a third sidewall 14*c*, and an oppositely disposed fourth sidewall 14*d*. The third and fourth sidewalls 14*c*, 14*d* extend between the first and second sidewalls 14*a*, 14*b*. The first sidewall 14*a* is a front sidewall, the second sidewall 14*b* is a back sidewall, the third sidewall 14*c* is a left sidewall and the fourth sidewall 14*d* is a right sidewall.

The top 12 and the plurality of sidewalls 14 cooperatively define an interior 16 (shown as a dashed line in FIG. 1). The interior 16 is adapted to receive items (e.g., cargo, vehicles, etc.) and to shelter these items from the outside environment.

The interior 16 of the storage enclosure 10 is accessible through an opening 18. In the example shown in FIG. 1, the first sidewall 14*a* defines the opening 18. For example, the first sidewall 14*a* includes a door jamb 20 and a header 22 that cooperatively define the opening 18.

The storage enclosure 10 further includes an overhead door assembly 24. The overhead door assembly 24 includes an overhead door 200, a plurality of roller assemblies mounted on the overhead door 200, and an overhead door track assembly 30.

The overhead door 200 is moveable between an open position and a closed position. In the open position, the overhead door 200 is fully raised so that the interior 16 of the storage enclosure 10 is accessible through the opening 18. In the closed position, the overhead door 200 is fully lowered such that access to the interior 16 through the opening 18 is blocked by the overhead door 200. In FIG. 1, the overhead door 200 is shown in the closed position.

Figure 2:
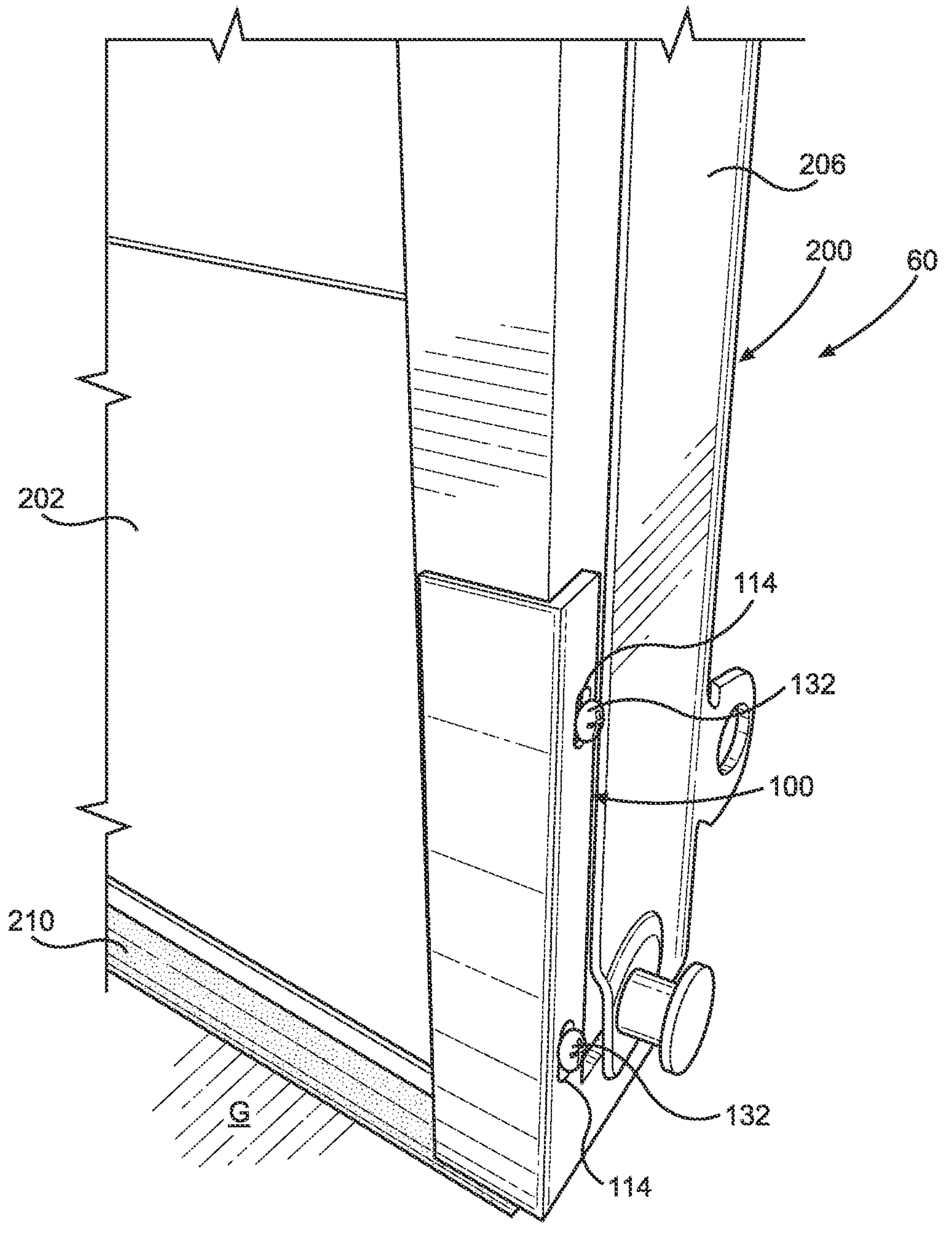
FIG. 2 is a front isometric view of a kit that includes a seal attached to a portion of the overhead door shown in FIG. 1.
Figure 3:
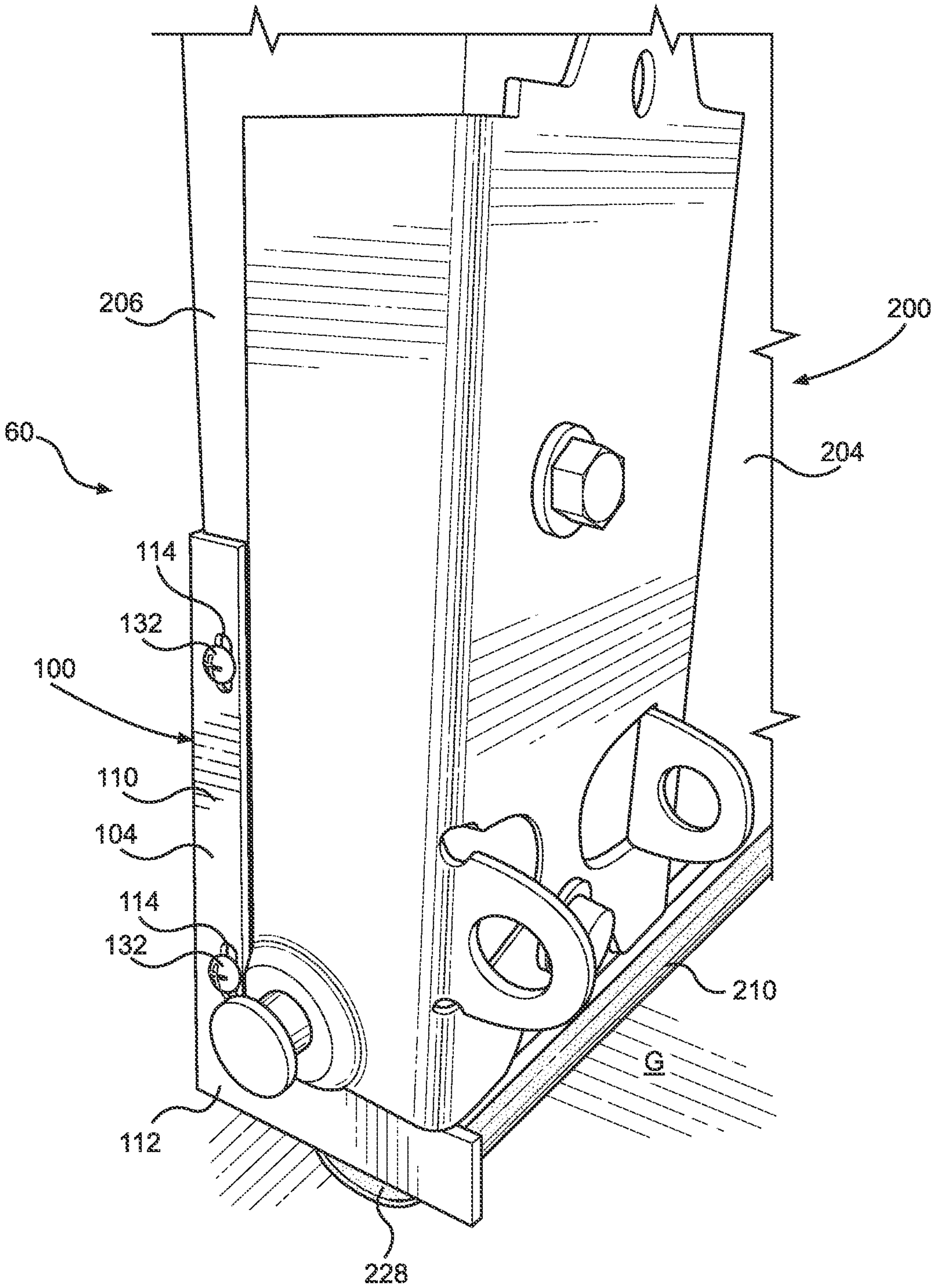
FIG. 3 is a rear isometric view of the seal attached to the overhead door.

The overhead door 200 has an exterior surface 202 and an interior surface 204 (shown in FIGS. 2 and 3). The interior surface 204 faces in a direction toward the interior 16 while the exterior surface 202 faces in a direction away from the interior 16 of the storage enclosure 10.

The overhead door 200 includes multiple panels 36. In the example shown in FIG. 1, the overhead door 200 includes a first panel 36*a*, a second panel 36*b*, a third panel 36*c* and a fourth panel 36*d*. When the overhead door 200 is in the closed position (shown in FIG. 1), the fourth panel 36*d* is the upper-most panel while the first panel 36*a* is the lower-most panel.

Roller assemblies are mounted to the overhead door 200. The roller assemblies can be mounted to the interior surface 204 of the overhead door 200. The roller assemblies are configured to slide on the overhead door track assembly 30 to facilitate moving the overhead door 200 between the open and closed positions. The roller assemblies can share aspects with the roller assemblies that are described in U.S. patent application Ser. No. 16/200,112, filed on Nov. 26, 2018, and in U.S. patent application Ser. No. 12/560,105, filed on Sep. 15, 2009, which are hereby incorporated by reference in their entireties.

The overhead door track assembly 30 includes a first overhead door track assembly 30*a* and a second overhead door track assembly 30*b*. The first overhead door track assembly 30*a* includes a first horizontal track 54*a*, a first transition track 56*a*, and a first vertical track 58*a* disposed adjacent to one side of the opening 18. The second overhead door track assembly 30*b* includes a second horizontal track 54*b*, a second transition track 56*b*, and a second vertical track 58*b* disposed adjacent to an opposite side of the opening 18.

Figure 4:
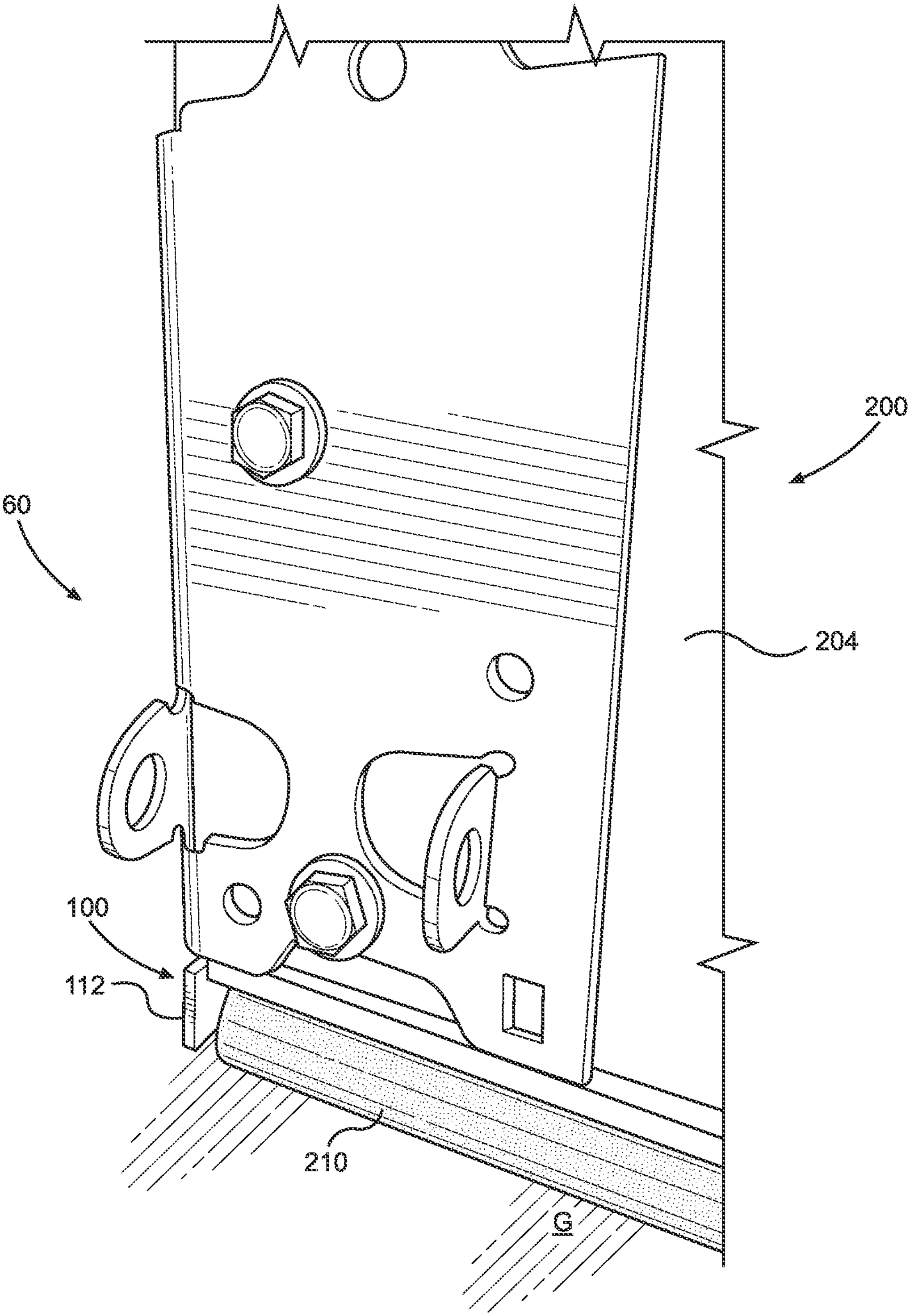
FIG. 4 is another rear isometric of the seal attached to the overhead door.

FIG. 2 is a front isometric view of a kit 60 for an overhead door 200 that includes a seal 100 attached to a portion of the overhead door 200. FIGS. 3 and 4 are rear isometric views of the kit 60 showing the seal 100 attached to the portion of the overhead door 200.

In FIGS. 2-4, the seal 100 is attached to a bottom right corner of the overhead door 200 by one or more fasteners 132 such as screws, that can form part of the kit 60. The kit 60 can also include a second seal, similar to the one shown in FIGS. 2-4, that can be attached in a similar fashion to the bottom left corner of the overhead door 200. Accordingly, the kit 60 can include the seal 100, the second seal, and the fasteners 132 for attaching to the seals to the respective bottom right and bottom left corners of the overhead door 200.

Figure 5:
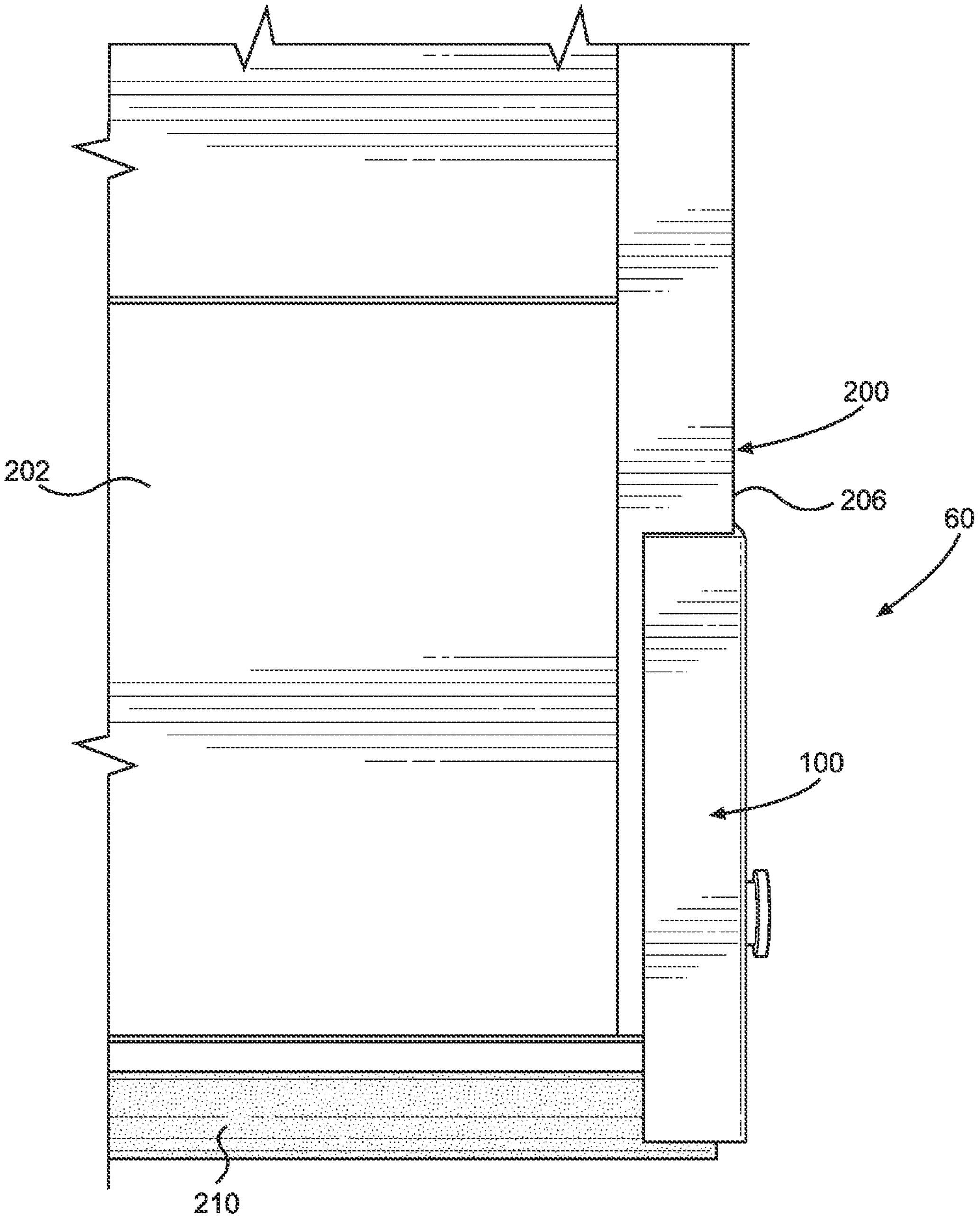
FIG. 5 is a front view of the seal attached to the overhead door.
Figure 6:
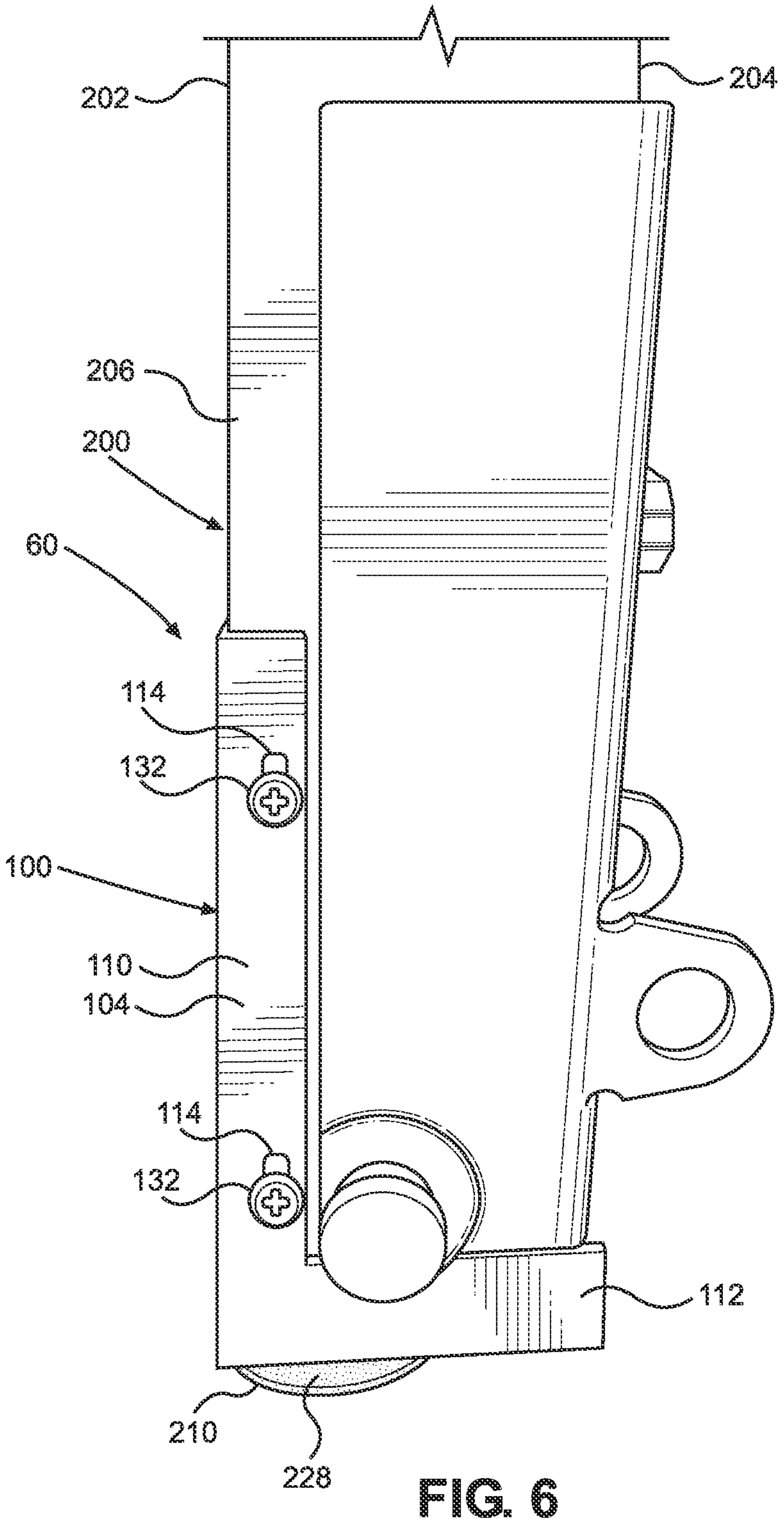
FIG. 6 is a side view of the seal attached to the overhead door.
Figure 7:
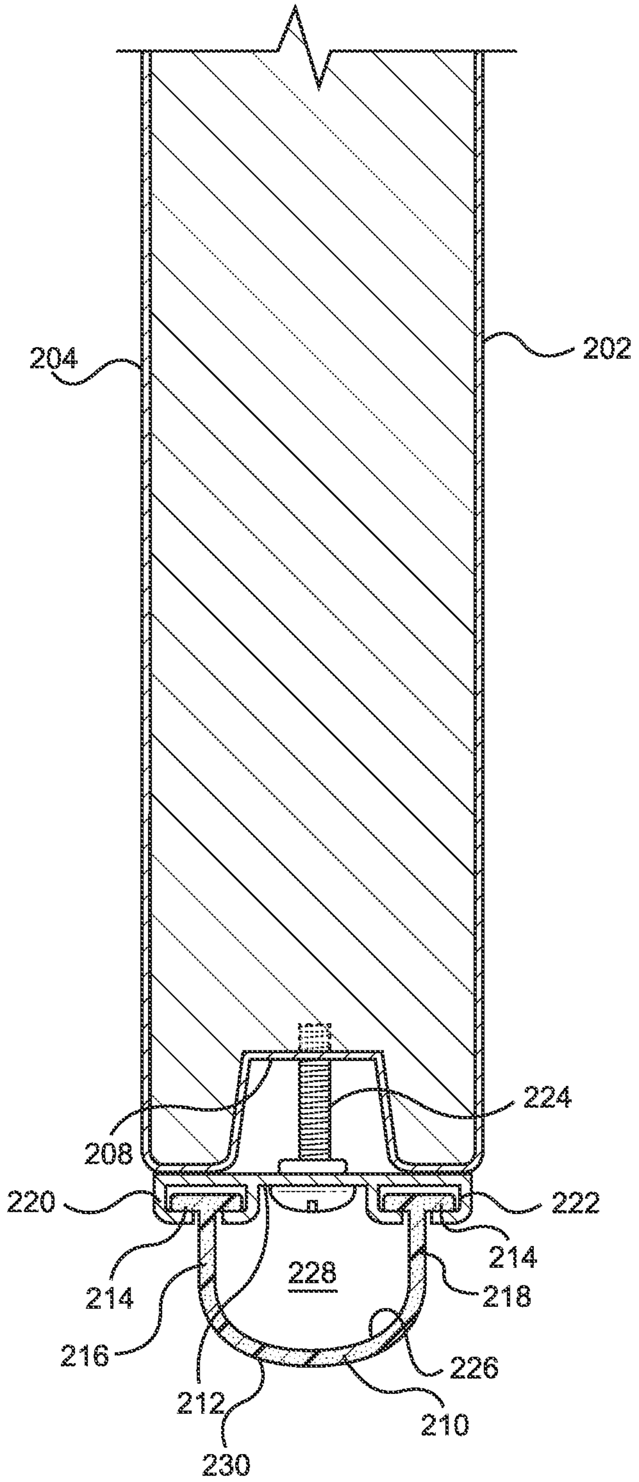
FIG. 7 is a cross-sectional view of the overhead door.

FIGS. 5 and 6 are respective front and side views of the kit 60 showing the seal 100 attached to the bottom right corner of the overhead door 200. FIG. 7 is a cross-sectional view of the overhead door 200. Referring now to FIGS. 2-7, the overhead door 200 includes the exterior surface 202, and the interior surface 204 separated from the exterior surface 202 by a side surface 206. The overhead door 200 further includes an astragal 210 that compresses when the overhead door 200 touches the ground Gin the closed position. The astragal 210 provides a cushion for when the overhead door 200 is moved from the open position into the closed position, and a seal between a bottom surface 208 of the overhead door 200 and the ground G.

As shown in FIG. 7, the astragal 210 has a convex shape that projects from the bottom surface 208 when the astragal is attached to the overhead door 200 and is uncompressed between the bottom surface 208 and the ground. In some examples, the astragal 210 has a semi-circular cross-sectional shape when uncompressed and attached to the overhead door 200.

The astragal 210 is made of a sheet of flexible rubber material having tabs 214 at opposite ends 216, 218. The tabs 214 are insertable into respective rails 220, 222 formed by a bracket 212 that is attached to the bottom surface 208 of the overhead door 200 by fasteners 224 such as screws. The tabs 214 can slide inside the respective rails 220, 222 for removably attaching the astragal 210 to the bracket 212, and thereby providing the convex shape.

Figure 8:
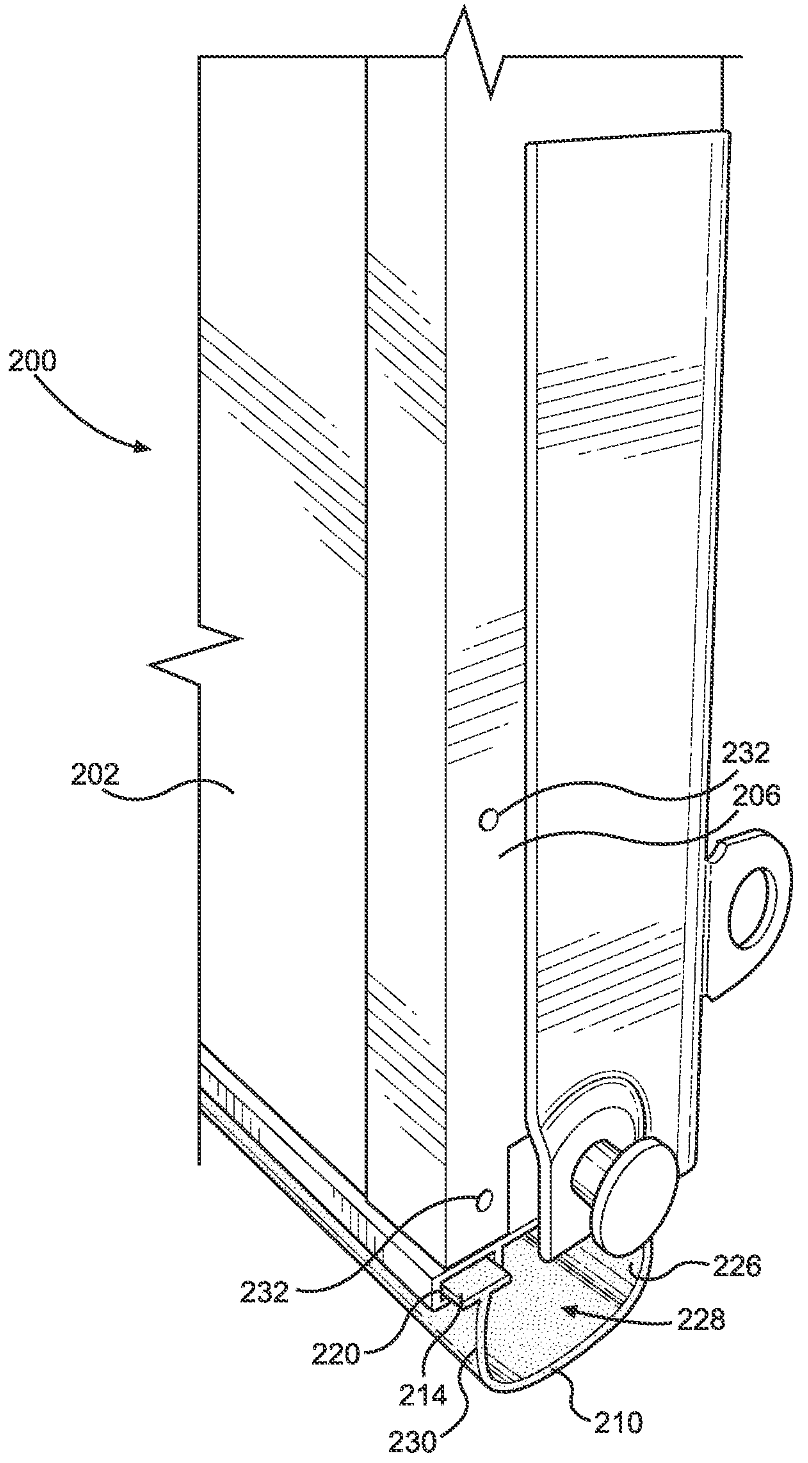
FIG. 8 is a front isometric view of the overhead door with the seal removed.
Figure 9:
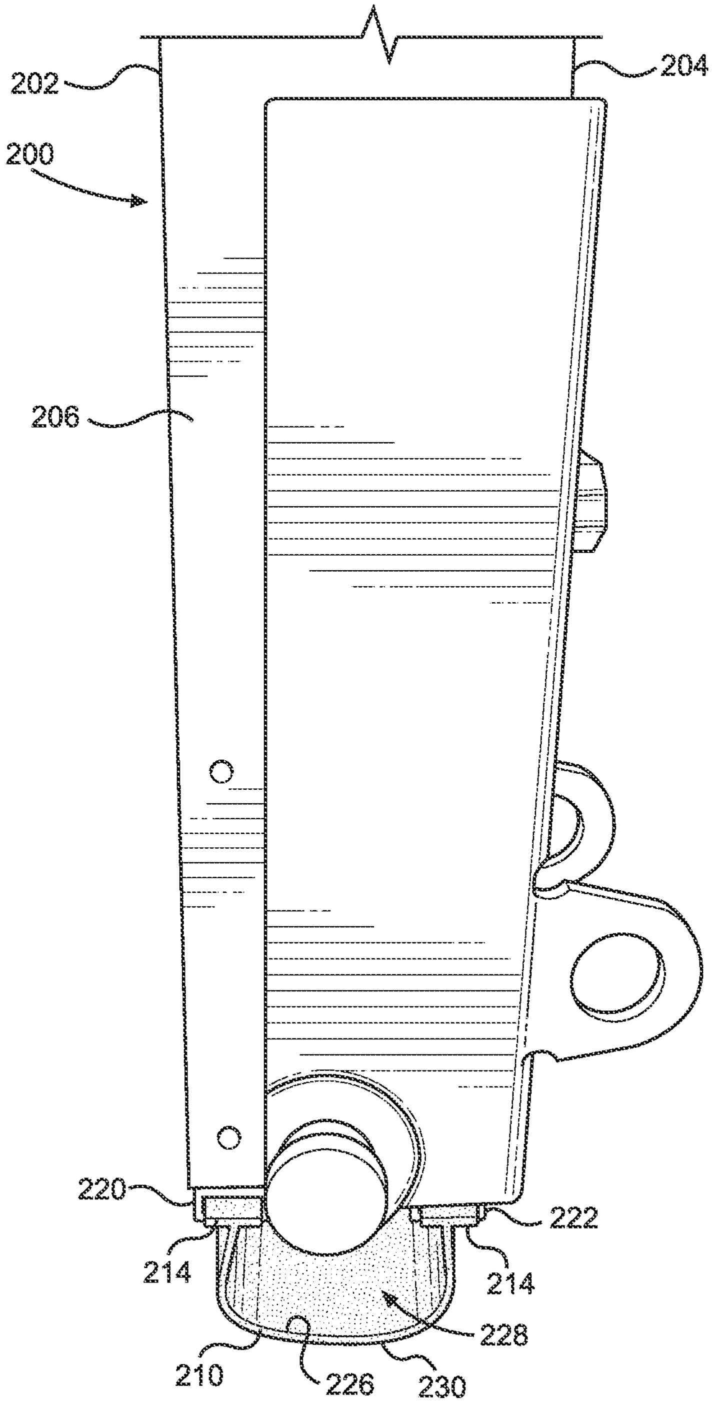
FIG. 9 is a side view of the overhead door with the seal removed.

FIGS. 8 and 9 are front isometric and side views of the overhead door 200 with the seal 100 removed. As shown in FIGS. 8 and 9, the astragal 210 defines a hollow space 228 between an interior surface 226 of the astragal 210 and the bottom surface 208 of the overhead door 200. When an exterior surface 230 of the astragal 210 is pushed against the ground due to the overhead door 200 being moved into the closed position, the astragal 210 compresses.

When the overhead door 200 is in the closed position, a gap can exist between the ground, the bottom surface 208 of the overhead door 200, and the opening 18 of the storage enclosure 10 due to the astragal 210 not completely filling the space between the ground, the overhead door 200, and the opening 18 when the astragal 210 is compressed. The gap can cause air flow between the interior 16 of the storage enclosure 10, which can lower the energy efficiency of the storage enclosure. Also, the gap can provide a passageway for pests such as mice and insects to enter into the interior 16 of the storage enclosure 10.

The seal 100, when attached to the overhead door 200, is structured to cover the gap between the ground, the bottom surface 208 of the overhead door 200, and the opening 18 of the storage enclosure 10. The seal 100 can prevent cold, heat, moisture, dirt, and pests such as mice and insects from entering into the interior 16 of the storage enclosure 10 through the gap.

FIGS. 10-17 are respective exterior isometric, interior isometric, right side, left side, front, rear, top, and bottom views of the seal 100. In the example shown in FIGS. 10-17, the seal 100 is shaped for attachment to the bottom right corner of the overhead door 200. As described above, a second seal having the same features and characteristics of the seal 100 can be shaped for attachment to the bottom left corner of the overhead door 200.

Figure 10:
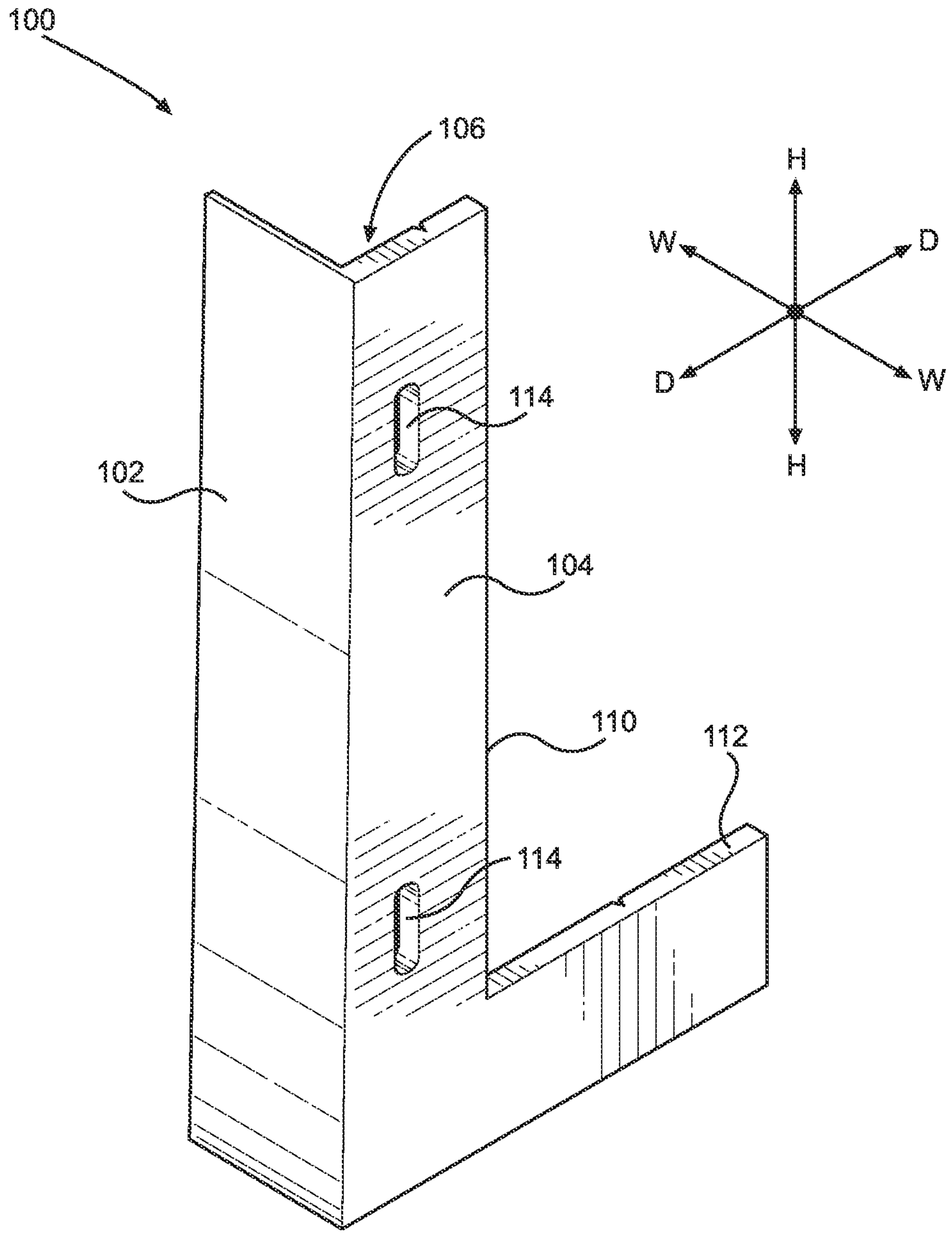
FIG. 10 is an exterior isometric view of the seal.
Figure 16:
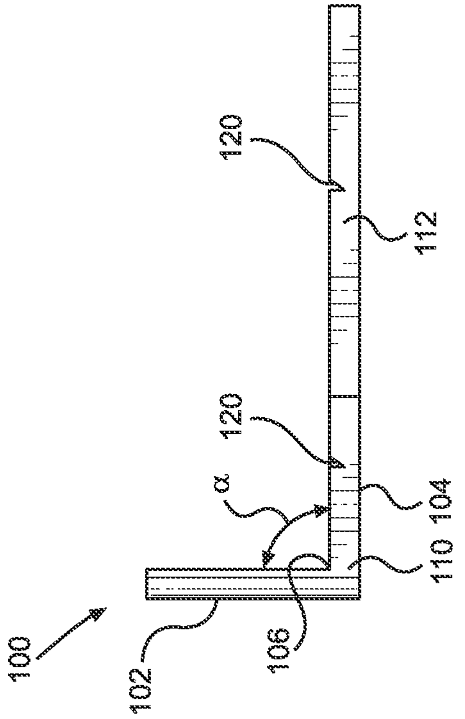
FIG. 16 is a top view of the seal.

The seal 100 includes a first sidewall 102, and a second sidewall 104 that extends from the first sidewall 102. As shown in FIGS. 10 and 16, the first and second sidewalls 102, 104 are separated by an angle α and form an interior corner 106. In the example shown in the figures, the angle α between the first and second sidewalls 102, 104 is a right angle (i.e., 90 degrees) such that the second sidewall 104 extends perpendicularly from the first sidewall 102.

Figure 14:
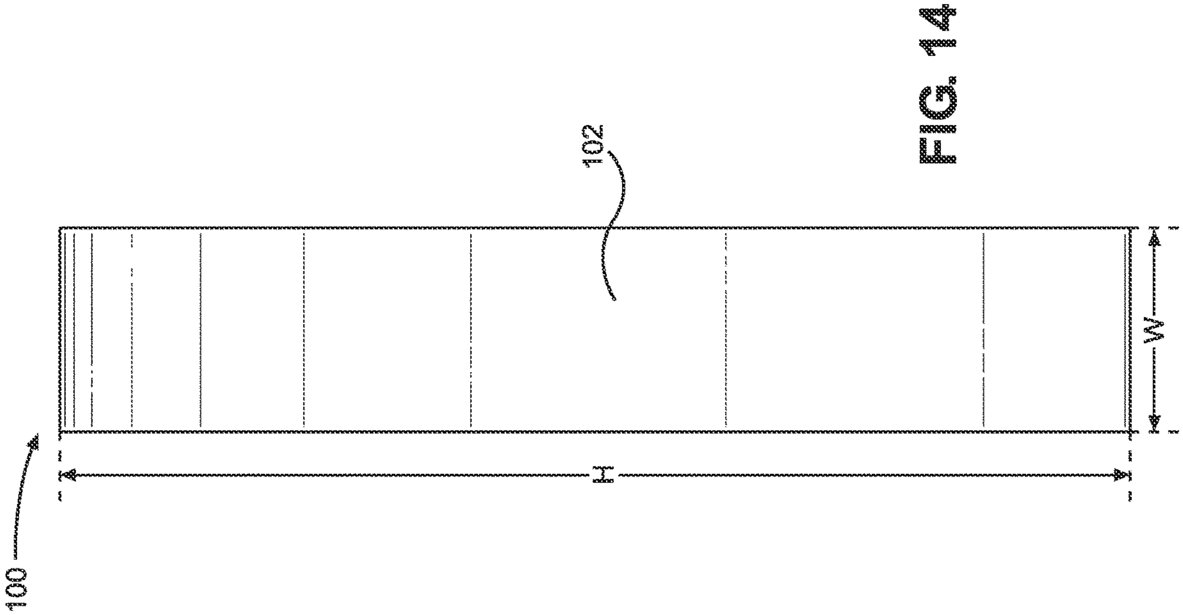
FIG. 14 is a front view of the seal.
Figure 17:
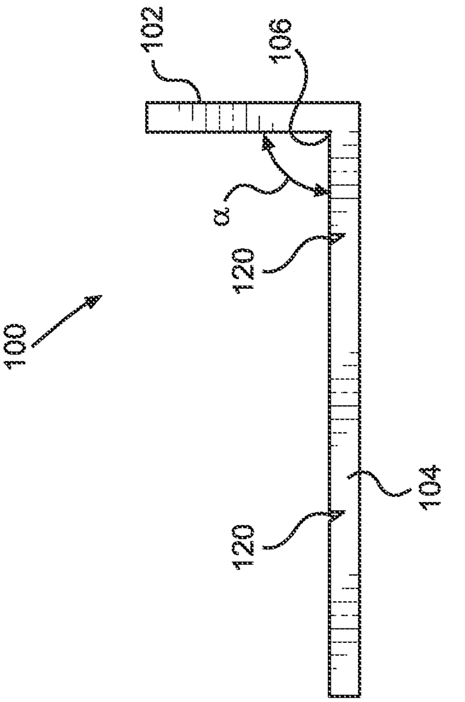
FIG. 17 is a bottom view of the seal.

The seal 100 has mutually perpendicular height H, width W, and depth D. As shown in FIGS. 10 and 14, the first sidewall 102 is delimited by the height H and width W. In some examples, the first sidewall 102 has a height H between about 3 inches and about 5 inches, and a width W between about 0.5 inches and about 1 inch. In some examples, the first sidewall 102 has a height H of about 4 inches, and a width W of about 0.75 inches. As will be described in more detail below, the seal 100 includes features that facilitate adjusting the height H and width W of the first sidewall 102 to accommodate differently sized overhead doors.

Figure 12:
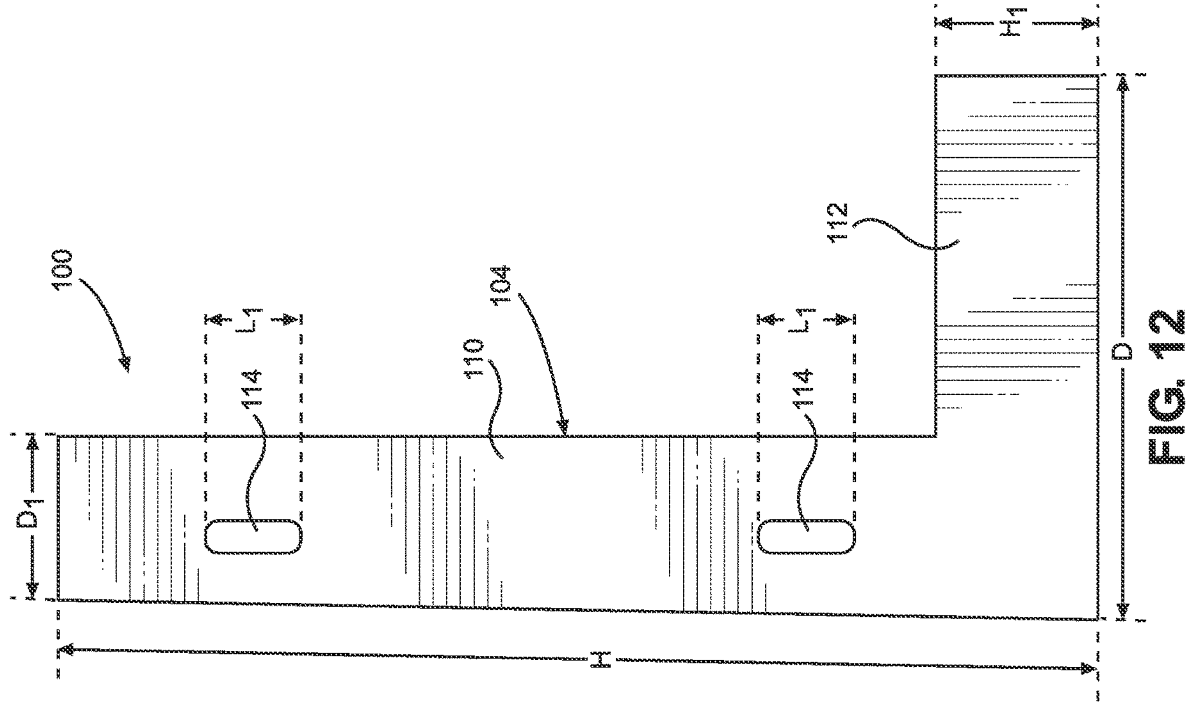
FIG. 12 is a right side view of the seal.
Figure 15:
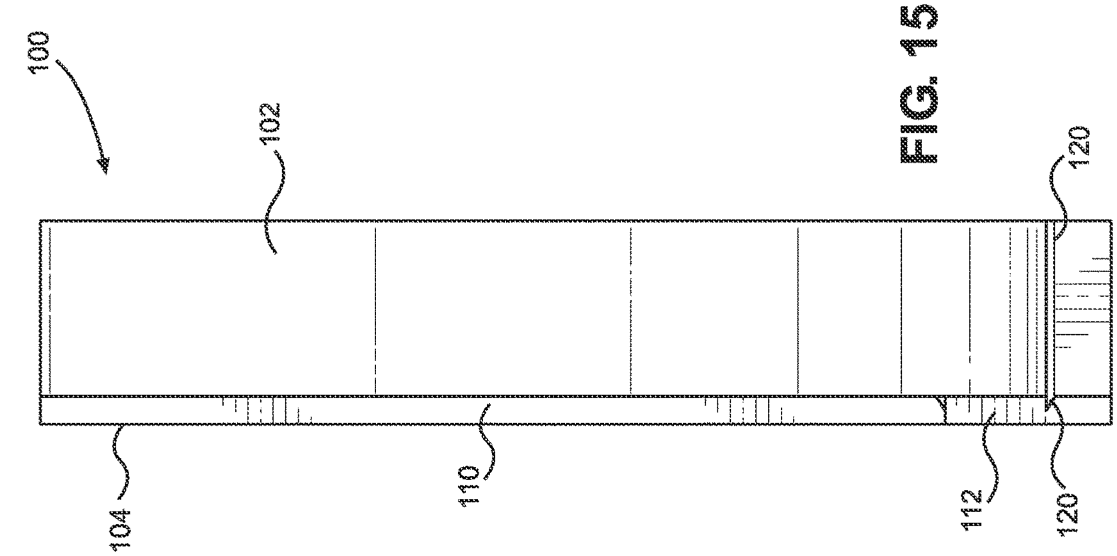
FIG. 15 is a rear view of the seal.

As shown in FIGS. 10 and 12, the second sidewall 104 is delimited by the height H and depth D. In some examples, the second sidewall 104 has a height H between about 3 inches and about 5 inches, and a depth D between about 2 inches and about 4 inches. In some examples, the second sidewall 104 has a height H of about 4 inches, and a depth D of about 2 inches. As will be described in more detail, the seal 100 includes features that facilitate adjusting the height H and depth D of the second sidewall 104 to accommodate differently sized overhead doors.

The second sidewall 104 includes a longitudinal portion 110 that extends along the height H, and a lateral portion 112 that extends along the depth D. In the example illustrated in the figures, the lateral portion 112 extends orthogonally from the longitudinal portion 110 providing the second sidewall 104 with a substantial L shape. The longitudinal portion 110 can define a partial depth Di between about 0.25 inches and about 0.5 inches. The lateral portion 112 can define a partial height Hi between about 0.5 inches and about 0.75 inches.

The seal 100 includes apertures 114 that can each receive a fastener 132 such as a screw for attaching the seal 100 to a bottom corner of the overhead door 200 (see FIGS. 1-3). The fasteners 132 can be screwed into holes 232 (see FIG. 8) that are drilled into the side surface 206 of the overhead door. While the apertures 114 are shown on the longitudinal portion 110 of the second sidewall 104, the apertures 114 can be provided elsewhere on the seal 100 such as on the lateral portion 112 of the second sidewall 104, and/or on the first sidewall 102.

In this example, the seal 100 includes two of the apertures 114. In other examples, the seal 100 can have fewer than two apertures such as a single aperture. Also, the seal 100 can have more than two apertures for attaching the seal to overhead doors of various sizes.

As shown in FIG. 5, the seal 100 when attached to the bottom right or bottom left corners of the overhead door 200 extends beyond the bottom surface 208 of the overhead door 200. When the overhead door 200 is pressed against the ground G such as when moved into the closed position, the astragal 210 first contacts the ground G and compresses due to its hollow shape, thereby absorbing at least some of the force. As described above, the seal 100 is structured to cover the gap between the ground, the bottom surface 208 of the overhead door 200, and the opening 18 of the storage enclosure 10. In some instances, the bottom of the seal 100 may also hit the ground G once the astragal 210 is compressed against the ground G.

As shown in FIGS. 6, 9, and 12, the apertures 114 each have an extended length Li to provide a tolerance for the seal 100 to move relative to the overhead door 200 and the fasteners 132 when the bottom of the seal 100 hits the ground due to compression of the astragal 210. The extended length Li extends in the direction that the overhead door 200 slams into the ground. As shown in the figures, the extended length Li extends parallel to the height H of the seal 100. In some examples, the extended length Li is between about 0.25 inches and about 0.5 inches long.

Figure 11:
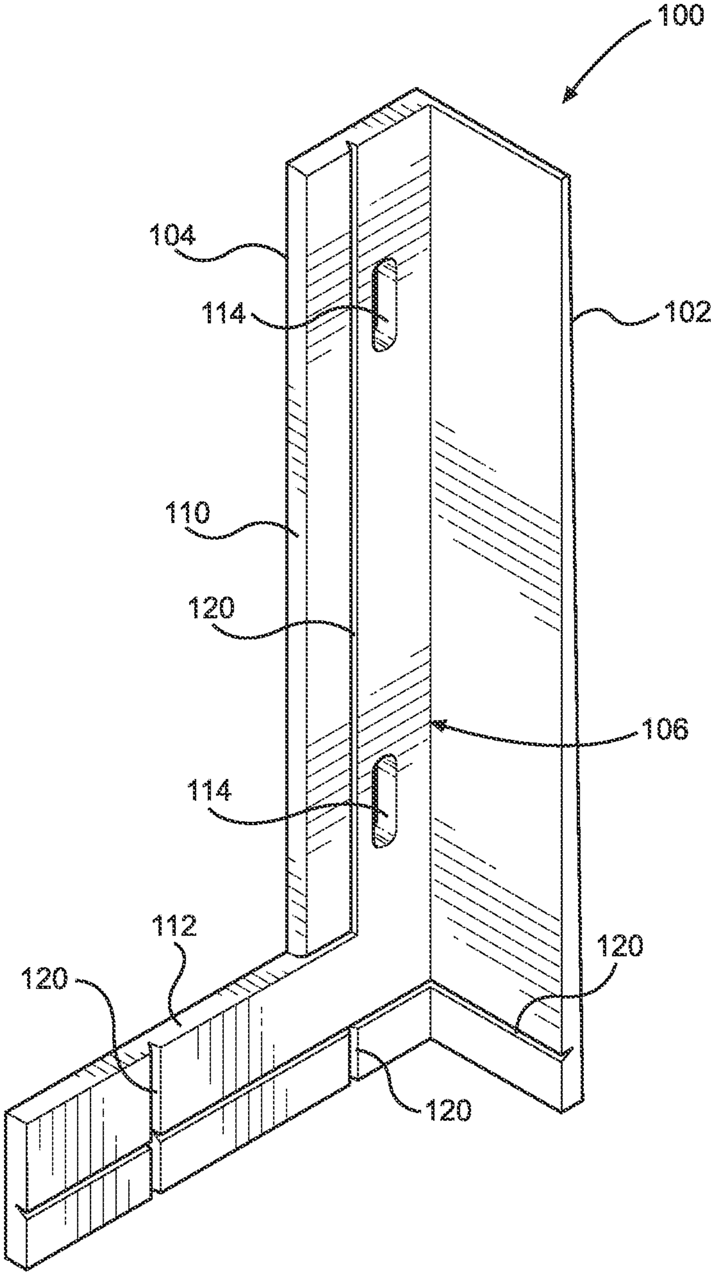
FIG. 11 is an interior isometric view of the seal.
Figure 13:
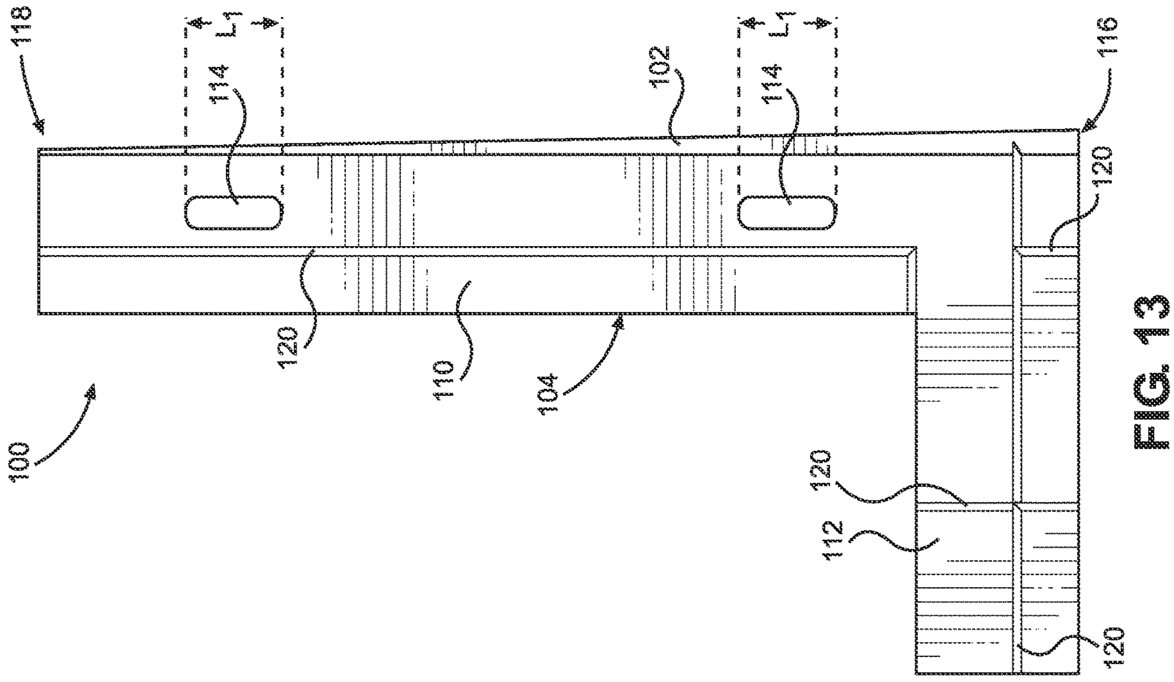
FIG. 13 is a left side view of the seal.

As shown in FIGS. 11 and 13, the first sidewall 102 is tapered along the height H. For example, the first sidewall 102 is thicker towards a bottom portion 116 and gradually gets thinner towards a top portion 118. This allows the first sidewall 102 to be flush with the exterior surface 202 of the overhead door 200 when attached to the overhead door, as shown in FIGS. 2 and 5.

As shown in FIGS. 11, 13, and 15-17, the first and second sidewalls 102, 104 each include grooves 120 on interior surfaces of the first and second sidewalls 102, 104. The grooves 120 can help facilitate a user to adjust the height H, width W, and depth D of the seal 100 before attachment of the seal 100 to the overhead door 200. For example, a pliers or similar type of tool can be used to break the seal 100 along the grooves 120 to adjust the height H, width W, and depth D. Also, a cutting knife can be used to score the grooves 120 to further facilitate breaking the seal 100 along the grooves 120 to adjust the height H, width W, and depth D.

Figure 18:
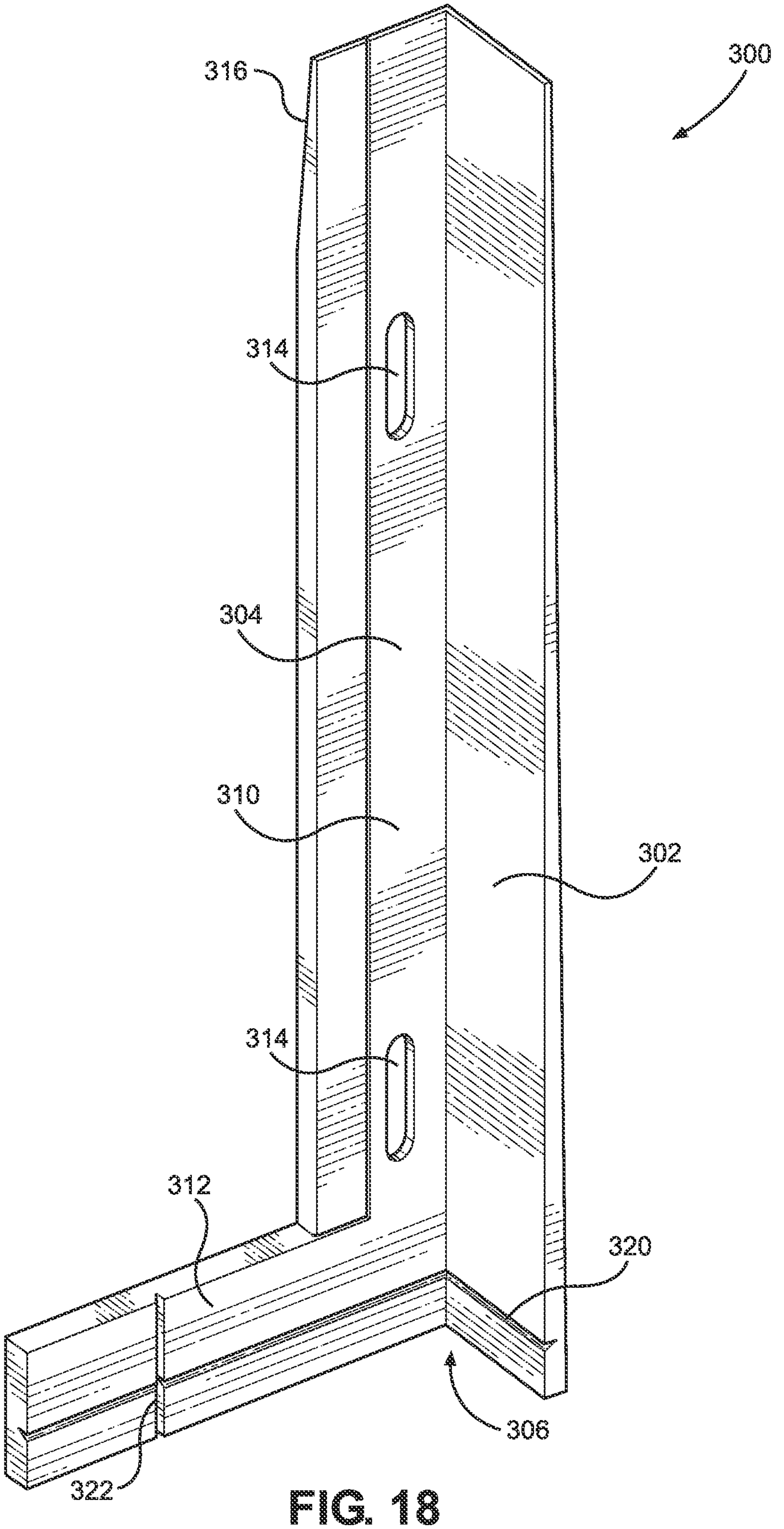
FIG. 18 is an interior isometric view of another example of a seal for the overhead door shown in FIG. 1.
Figure 19:
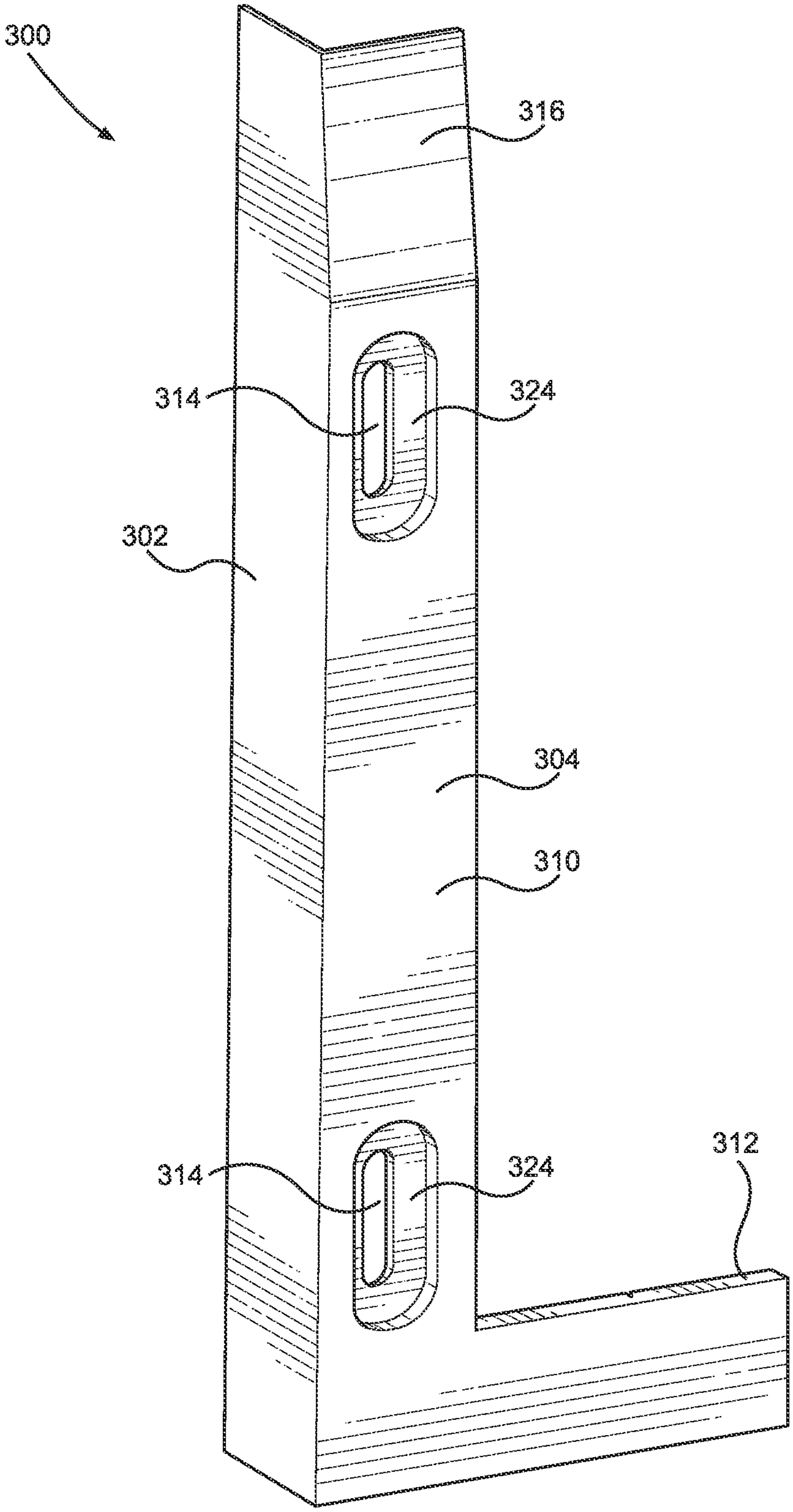
FIG. 19 is an exterior isometric view of the seal of FIG. 18.

FIGS. 18 and 19 are respective interior and exterior isometric views of another example of a seal 300 for the overhead door 200. In the example shown in FIGS. 18 and 19, the seal 300 is shaped for attachment to the bottom right corner of the overhead door 200. A second seal having the same features and characteristics of the seal 300 can be shaped for attachment to the bottom left corner of the overhead door 200.

FIGS. 20-25 are respective left side, right side, rear, front, top, and bottom views of the seal 300. Referring now to FIGS. 20-25, the seal 300 shares many of the same features and characteristics as the seal 100. For example, the seal 300 includes a first sidewall 302, and a second sidewall 304 that extends from the first sidewall 302. The first and second sidewalls 302, 304 are separated by an angle α (see FIG. 24) and form an interior corner 306. In this example, the angle α between the first and second sidewalls 302, 304 is a right angle (i.e., 90 degrees) such that the second sidewall 304 extends perpendicularly from the first sidewall 302.

The seal 300 has mutually perpendicular height H', width W', and depth D'. The first sidewall 302 is delimited by the height H' and width W'. The second sidewall 304 is delimited by the height H' and depth D'. The seal 300 includes a groove 320 that can facilitate adjusting the height H' of the first and second sidewalls 302, 304. For example, the groove 320 can be broken or cut to remove a bottom portion of either the first sidewall 302 or the second sidewall 304 to reduce the height H' of one or both of the first and second sidewalls 302, 304.

In some examples, the height H' is about 6 inches, the width W' is about 2⅛ inches, and the depth D' is about 13/16 inches. In the example illustrated in FIGS. 20-25, the first sidewall 302 of the seal 300 has a height H' that is larger than the height H of the seal 100.

The second sidewall 304 includes a longitudinal portion 310 that extends along the height H', and a lateral portion 312 that extends along the depth D'. The lateral portion 312 can extend orthogonally from the longitudinal portion 310 providing an L shape. The shape and size of the first and second sidewalls 302, 304 can aid in mounting the seal 300 next to the hardware of a sectional door (e.g., the overhead door 200) which can create an uneven surface at the bottom corner of the sectional door creating a difficult environment to mount a seal.

The seal 300 includes apertures 314 that are structured to each receive a fastener 132 such as a screw for attaching the seal 300 to a bottom corner of the overhead door 200 (see FIGS. 1-3). In this example, the apertures 314 of the seal 300 include recessed portions 324. The recessed portions 324 allow the fasteners 132 to be flush with the second sidewall 304.

This can prevent the fasteners 132 from interfering with secondary seals that can be attached to the side surface 206 of the overhead door 200 or to the opening 18 of the storage enclosure 10 that are used to seal the space between the overhead door 200 and the opening 18. Accordingly, the recessed portions 324 can aid in the ability of a secondary door seal to be easily and effectively mounted to the end of a sectional door, such as the overhead door 200.

In the example of the seal 300 shown in FIGS. 18-25, the apertures 314 are shown on the longitudinal portion 310 of the second sidewall 304. In further examples, the apertures 314 can be provided elsewhere on the seal 300. For example, the apertures 314 can be included on the lateral portion 312 of the second sidewall 304, and/or on the first sidewall 302.

In the example shown in the figures, the seal 300 has two apertures. In other examples, the seal 300 can have fewer than two apertures such as a single aperture. Also, the seal 300 can have more than two apertures for attaching the seal to overhead doors of various sizes.

The seal 300 when attached to the bottom right or bottom left corners of the overhead door 200 extends beyond the bottom surface 208 of the overhead door 200. The seal 300 is structured to cover the gap between the ground, the bottom surface 208 of the overhead door 200, and the opening 18 of the storage enclosure 10 when the astragal 210 is compressed against the ground G when the overhead door 200 is moved into the closed position.

Figure 25:
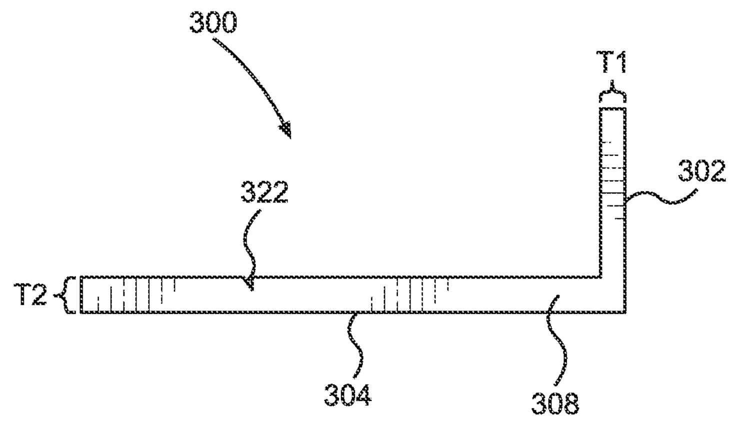
FIG. 25 is a bottom view of the seal of FIG. 18.

In some instances, a bottom end 308 of the seal 300 hits the ground G once the astragal 210 is compressed against the ground. As shown in FIG. 25, the first sidewall 302 has a thickness T1, and the second sidewall 304 has a thickness T2 at the bottom end 308. In this example, the thickness T2 of the second sidewall 304 is larger than the thickness T1 of the first sidewall 302. This can improve the durability of the seal 300 when the bottom end 308 hits the ground when the overhead door 200 is moved into the closed position, and from the fasteners 132 that fix the second sidewall 304 to the side surface 206 of the overhead door.

The apertures 314 each have the extended length Li to provide a tolerance for the seal 300 to move relative to the overhead door 200 and the fasteners 132 when the bottom end 308 of the seal 300 hits the ground due to compression of the astragal 210. The extended length Li extends in the direction that the overhead door 200 slams into the ground. As shown in the figures, the extended length Li extends parallel to the height H' of the seal 300.

Figure 20:
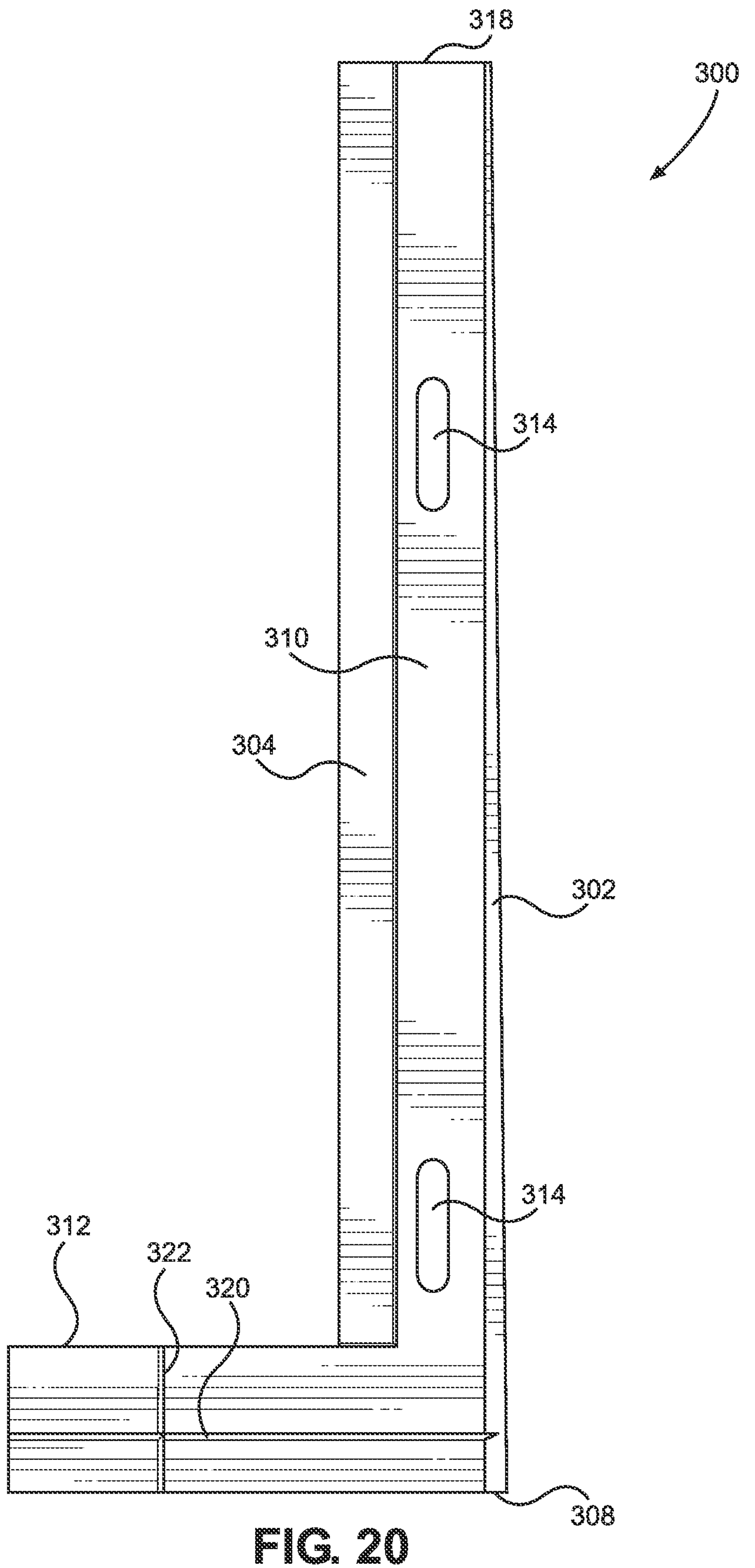
FIG. 20 is a left side view of the seal of FIG. 18.
Figure 21:
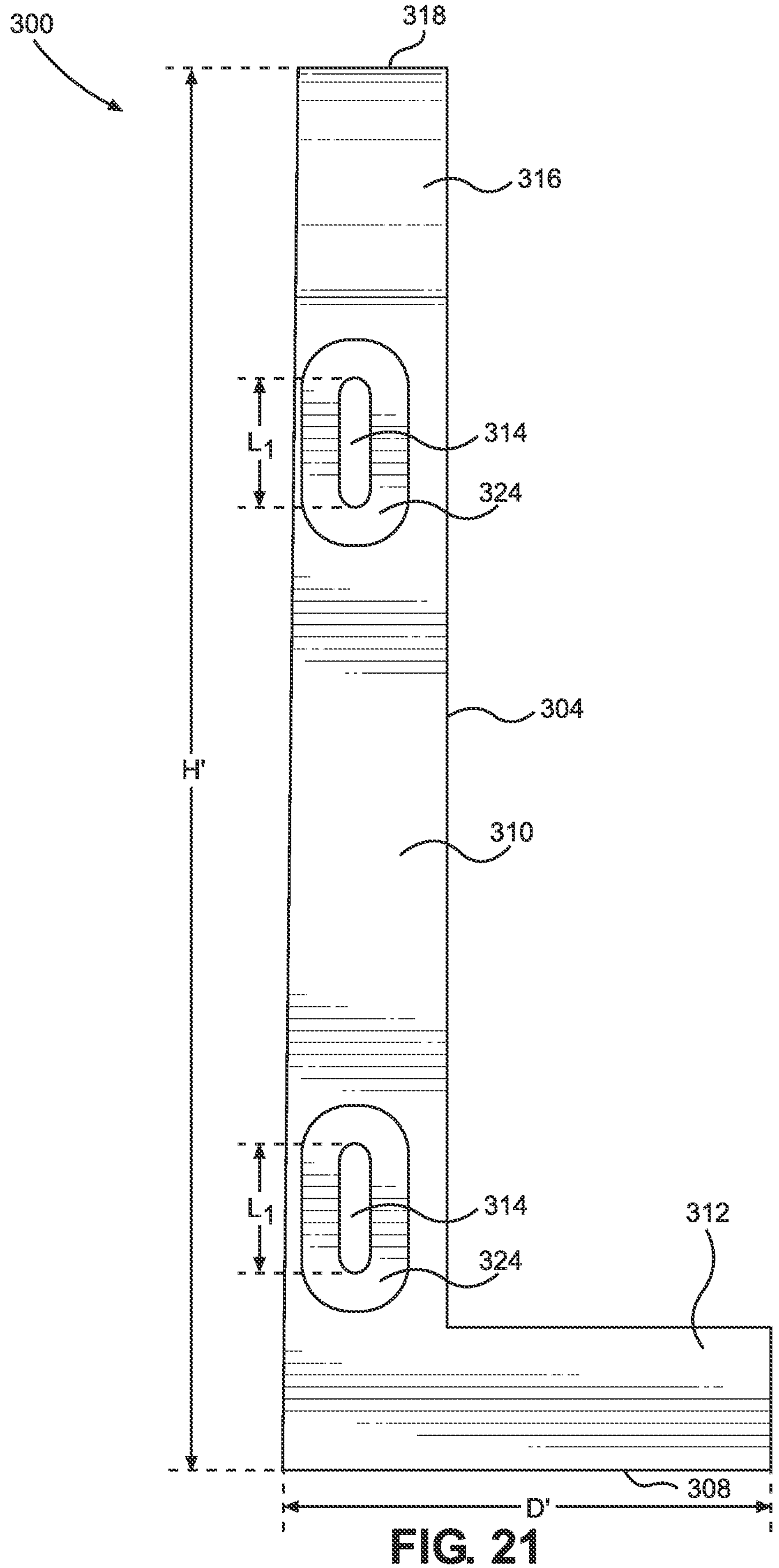
FIG. 21 is a right side view of the seal of FIG. 18.
Figure 22:
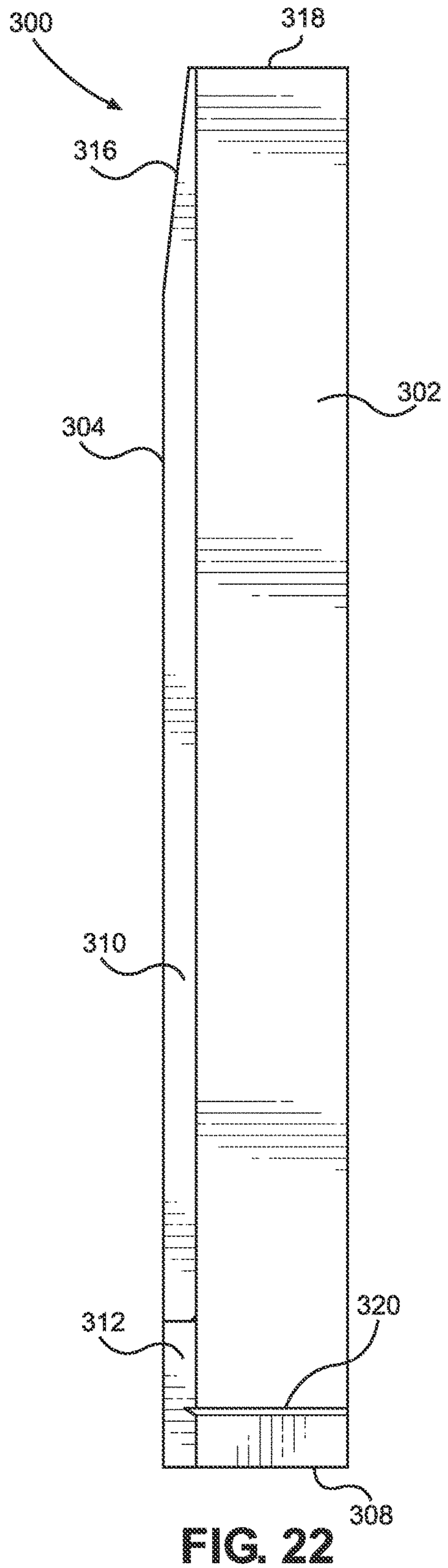
FIG. 22 is a rear view of the seal of FIG. 18.
Figure 23:
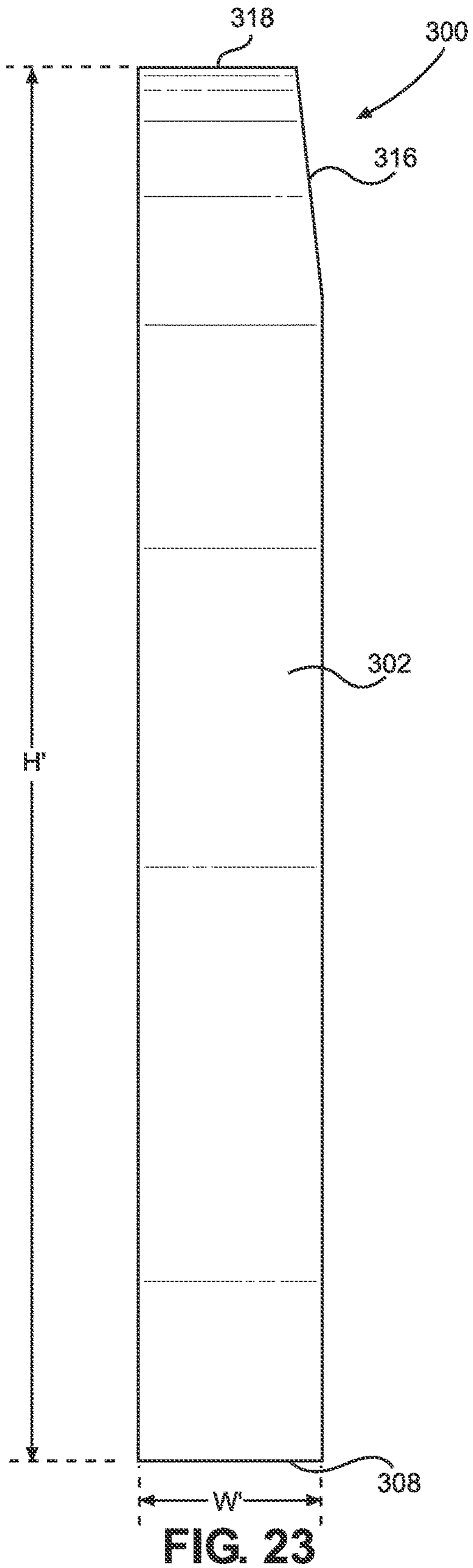
FIG. 23 is a front view of the seal of FIG. 18.
Figure 24:
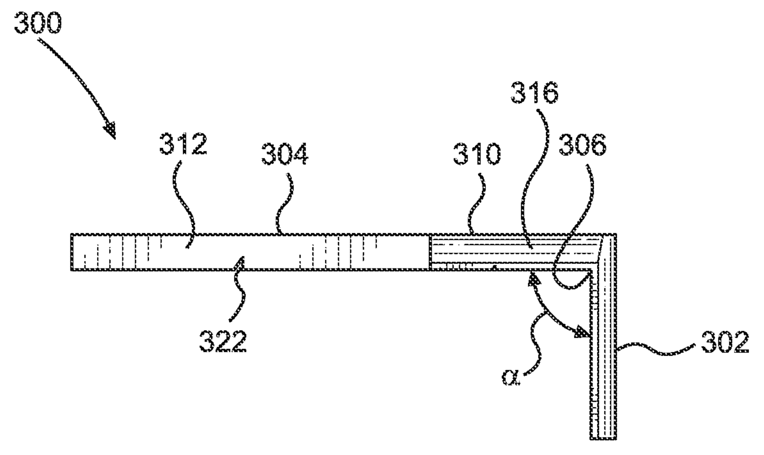
FIG. 24 is a top view of the seal of FIG. 18.

As shown in FIGS. 18 and 20, the first sidewall 302 is tapered along the height H'. For example, the first sidewall 302 is thicker towards the bottom end 308 and gradually gets thinner towards a top end 318 of the seal 300. The taper on the first sidewall 302 allows the first sidewall 302 to be flush with the exterior surface 202 of the overhead door 200.

As further shown in FIGS. 18-25, the second sidewall 304 includes a slant 316 at the top end 318. The slant 316 can help prevent the thickness T2 of the second sidewall 304 from interfering with secondary seals that can be attached to the side surface 206 of the overhead door 200 or to the opening 18 of the storage enclosure 10 that are used to seal the space between the overhead door 200 and the opening 18. Additionally, the slant 316 can provide a smooth transition for the secondary seals to overlap the second sidewall 304 of the seal 300. Accordingly, the slant 316 can aid in the ability of a secondary door seal to be easily and effectively mounted to the end of a sectional door, such as the overhead door 200.

The seal 300 includes grooves 320, 322 on the interior surfaces of the first and second sidewalls 302, 304. The grooves 320, 322 can help facilitate adjustment of the shape and size of the seal 300 before attachment of the seal 300 to the overhead door 200. For example, a pliers or similar type of tool can be used to break the seal 300 along the grooves 320, 322. Also, a cutting knife can be used to score the grooves 320, 322 to facilitate adjusting the shape and size of the seal 300. In this example, the groove 320 can help facilitate a user to adjust the height H' of the seal 300, and the groove 322 can help facilitate a user to adjust the depth D' of the seal 300.

The seals 100, 300 are made from a strong, highly flexible, shock absorbing, and durable material. In some examples, the seals 100, 300 are made of a material that can be 3D printed for improving the manufacturability of the seals. In some examples, the seals 100, 300 are made of a rubber-like (MJF) type of thermoplastic polyurethane (TPU) material. In further examples, the seals 100, 300 can be made of steel, aluminum, plastic, wood, and other types of durable materials compatible for attachment to the overhead door 200.

The various embodiments described above are provided by way of illustration only and should not be construed to be limiting in any way. Various modifications can be made to the embodiments described above without departing from the true spirit and scope of the disclosure.

What is claimed is:

1. A seal for an overhead door, the seal comprising:
mutually perpendicular height, width, and depth;
a first sidewall delimited by the height and the width and having a bottom adjacent a bottom of the seal and a top adjacent a top of the seal;
a second sidewall extending from the first sidewall, the second sidewall delimited by the height and the depth, the second sidewall including:
a longitudinal portion;
a lateral portion extending from the longitudinal portion; and
at least one aperture configured to receive a fastener for attaching the seal to a bottom corner of the overhead door, the at least one aperture having a length providing a tolerance for the seal to move relative to the overhead door and the fastener;
wherein the first sidewall is tapered from the bottom of the first sidewall to the top of the first sidewall, wherein the bottom of the first sidewall has a first thickness along the depth and the top of the first sidewall has a second thickness along the depth, wherein the first thickness is greater than the second thickness, and wherein the first sidewall, in vertical cross-section, has a triangular shape.

2. The seal of claim 1, wherein the first and second sidewalls each include at least one groove on an interior surface that facilitates adjusting the height and the depth of the seal.

3. The seal of claim 1, wherein the lateral portion extends orthogonally from the longitudinal portion providing the second sidewall with an L shape.

4. The seal of claim 1, wherein the at least one aperture includes a recessed portion.

5. The seal of claim 1, wherein the at least one aperture includes two apertures positioned on the longitudinal portion of the second sidewall, each aperture configured to provide the tolerance for the seal to move relative to the overhead door when the seal hits a ground surface.

6. The seal of claim 1, wherein the second sidewall includes a slanted surface decreasing a thickness of the longitudinal portion.

7. A kit comprising:
an overhead door, which includes:
an exterior surface;
an interior surface separated from the exterior surface by a side surface; and an astragal attached to a bottom surface of the overhead door; and a seal for covering a gap formed after compression of the astragal and formed between the bottom surface of the overhead door and a ground surface under the overhead door, the seal including:

a first sidewall configured to abut the exterior surface of the overhead door, the first sidewall having a bottom adjacent a bottom of the seal and a top adjacent a top of the seal;

a second sidewall extending from the first sidewall, and configured to abut the side surface of the overhead door, wherein the first sidewall and the second sidewall extend beyond the bottom surface of the overhead door to cover the gap, and wherein the first sidewall is tapered from the bottom of the first sidewall to the top of the first sidewall, wherein the bottom of the first sidewall has a first thickness and the top of the first sidewall has a second thickness, wherein the first thickness is greater than the second thickness, and wherein the first sidewall, in vertical cross-section, has a triangular shape; and at least one aperture configured to receive a fastener for attaching the seal to a bottom corner of the overhead door, the at least one aperture having an extended length providing a tolerance for the seal to move relative to the overhead door and the fastener when the seal hits the ground surface after the compression of the astragal.

8. The kit of claim 7, wherein the seal further includes grooves on interior surfaces of the first and second sidewalls that facilitate adjusting a height and a depth of the seal.

9. The kit of claim 7, wherein the at least one aperture of the seal comprises two apertures positioned on a longitudinal portion of the second sidewall, each of the apertures is configured to provide the tolerance for the seal to move relative to the overhead door when the seal hits the ground surface.

10. The kit of claim 7, wherein the second sidewall includes a slanted surface decreasing a thickness of a longitudinal portion of the second sidewall.

11. A seal for an overhead door, the seal comprising:

a first sidewall;

a second sidewall extending from the first sidewall, the first sidewall having a bottom adjacent a bottom of the seal and a top adjacent a top of the seal, the first and second sidewalls defining an interior corner, the interior corner covering an exterior surface and a side surface at a bottom exterior corner of the overhead door, the second sidewall including:

a longitudinal portion;

a lateral portion extending from the longitudinal portion; and at least one aperture that is configured to receive a fastener for attaching the seal to the bottom exterior corner of the overhead door;

wherein the first sidewall is tapered from the bottom of the first sidewall to the top of the first sidewall, wherein the bottom of the first sidewall has a first thickness and the top of the first sidewall has a second thickness, wherein the first thickness is greater than the second thickness, and wherein the first sidewall, in vertical cross-section, has a triangular shape.

12. The seal of claim 11, wherein the seal is defined by mutually perpendicular height, width, and depth, wherein the first sidewall is delimited by the height and the width, and wherein the second sidewall is delimited by the height and the depth.

13. The seal of claim 12, wherein the interior corner has first and second sidewalls have grooves to facilitate adjusting the height and the depth of the seal.

14. The seal of claim 12, wherein the longitudinal portion extends along the height, and the lateral portion extends along the depth.

15. The seal of claim 12, wherein the at least one aperture has a length that extends parallel to the height to provide a tolerance for the seal to move relative to the overhead door and the fastener when the seal hits a ground surface due to closure of the overhead door.

16. The seal of claim 11, wherein the second sidewall includes a slanted surface decreasing a thickness of the longitudinal portion.

* * * * *